Jan. 6, 1948.  S. C. HETH  2,433,904

HORSE HITCH ATTACHMENT FOR HARVESTERS

Filed June 29, 1946

INVENTOR:
Sherman C. Heth
BY Thiess Olson & Mecklenburger
ATTYS.

Patented Jan. 6, 1948

2,433,904

UNITED STATES PATENT OFFICE 2,433,904

HORSE HITCH ATTACHMENT FOR HARVESTERS

Sherman C. Heth, Racine, Wis., assignor to J. I. Case Company, Racine, Wis., a corporation of Wisconsin Application June 29, 1946, Serial No. 680,469

4 Claims. (Cl. 278—1)

My invention relates to a horse hitch attachment for harvesters.

One of the objects of my invention is to provide a horse hitch attachment for harvesters which will be rugged in construction and efficient in operation.

Further objects and advantages of the invention will be apparent from the description and claims.

In the drawings, in which an embodiment of my invention is shown,

Figure 1:
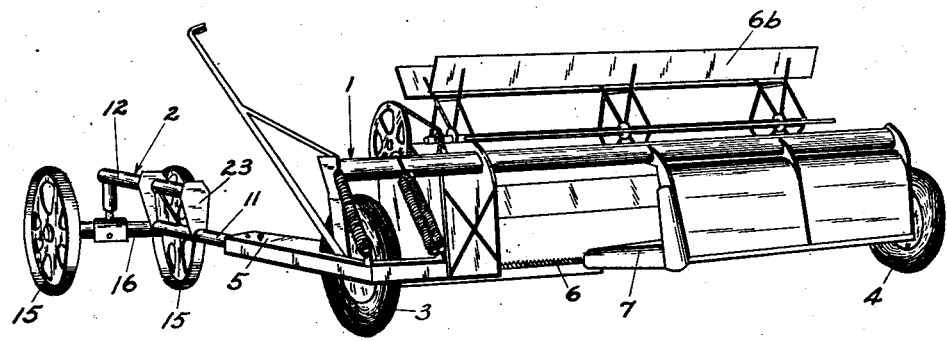
Figure 1 is a perspective view of a windrower provided with a horse hitch attachment.
Figure 2:
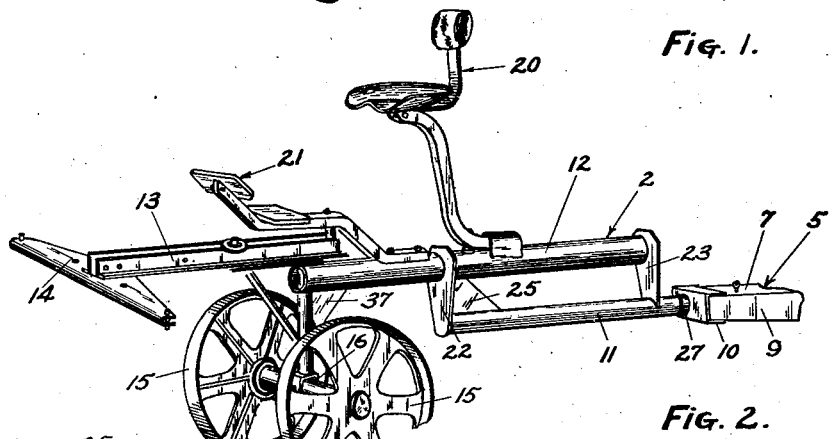
Fig. 2 is a perspective view of the horse hitch attachment.
Figure 3:
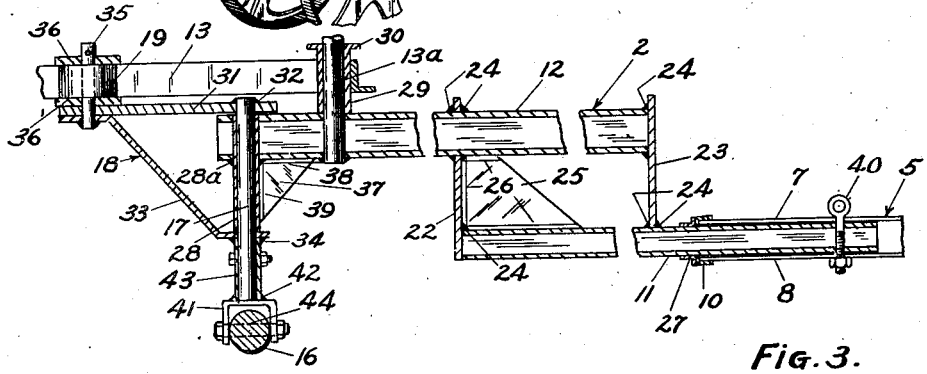
Fig. 3 is a vertical fore-and-aft section of the drawbars and tongues of the horse hitch attachment.

Referring to the drawings in detail, the construction shown comprises a harvesting machine 1 and a horse hitch attachment 2 therefor.

The harvesting machine shown is a windrower comprising a carriage having two wheels 3 and 4 at opposite ends thereof, a short tongue 5 extending forwardly therefrom, a reciprocable sickle 6 extending in the space between the wheels 3 and 4, a divider 6ª, a reel 6ᵇ, and an endless conveyor 7 extending in the rear of the sickle 6 from the divider 5 toward the stubble.

The short tongue 5 may be a sheet metal box-like construction comprising upper and lower spaced plates 7 and 8 secured together by web members 9 adjacent the side edges of the plates. A channel 10 is secured across the front of the tongue 5, the flanges of the channel overlapping the upper and lower plates 7 and 8. This channel has a hole therethrough to receive a tubular metal drawbar 11 forming part of the horse hitch attachment.

The horse hitch attachment comprises the drawbar 11, a second tubular metal drawbar 12 extending above and forwardly of said first drawbar and secured thereto, a tongue 13 pivotally mounted on a pin 13ª mounted on the second drawbar 12 somewhat in the rear of the front end thereof, a whiffletree 14 secured to the front end of the tongue 13, a pair of steering wheels 15, an axle 16 on which these wheels 15 are mounted, an upright pivot pin 17 mounted on the second drawbar 12 to rotate about an axis in front of the axis of the main tongue 13 and secured to the axle 16 to rotate therewith about a vertical axis, a short tongue 18 secured to rotate with the axle 16 and pivot pin 17, and a roller 19 mounted on the front end of the short tongue 18 to provide a lost-motion connection between the short tongue 18 and the main tongue 13. A seat 20 and footboard 21 may be mounted on the second drawbar 12.

The upper drawbar 12 is secured to the lower drawbar 11 by means of a metal plate 22 having an opening through which the upper drawbar 12 extends and extending downwardly and across the front end of the lower drawbar 11, and a rear metal plate 23 extending across the rear end of the upper drawbar 12 and secured thereto and having its lower edge embracing the upper part of the lower drawbar 11 and secured thereto. The plates 22 and 23 may be secured to the drawbars 11 and 12 by welding, as indicated at 24, or in any suitable manner.

In order to brace the upper and lower drawbars with respect to each other, a metal gusset plate 25 may be provided having its upper edge welded to the upper drawbar 12, its forward edge welded to the front plate and its lower edge welded to the lower drawbar 11, as indicated at 26. In order to provide a suitable support between the tongue 5 and the drawbar 11, a metal collar 27 may be secured to the channel 10, through which collar the drawbar 11 extends.

The pivot 17 may extend through a bearing sleeve 28 which extends through registering openings in the upper drawbar 12 and is secured thereto at its lower end at 28ª, as by welding. The tongue 13 may be pivotally mounted on the post 13ª by means of a metal sleeve 29 rotatably swiveled on the pivotal post 13ª, around which sleeve the angle iron of which the tongue 13 is formed, may be bent and to which it may be secured, as by welding. A suitable washer 30 is provided for preventing the sleeve from slipping up on the pivot.

The short tongue 18 comprises a metal bar 31 through which the pin 17 may extend and to which it may be welded at 32, and a lower metal strap or bar 33 having an opening at its lower rear end through which the pivot pin 17 extends and to which it is secured, as by welding, at 34. The roller 19 may be secured to the short tongue by means of a pivot pin 35 extending through registering openings in the upper and lower bars 31 and 33 and through a central opening in the roller 19. The roller 19 may be held against endwise movement transversely of the tongue 13 by means of upper and lower plates or washers 36, one above and one below the tongue 13.

In order to brace the bearing sleeve 28 with respect to the upper drawbar 12, a metal gusset 37 is provided, the upper edge of which may be welded to the drawbar 12 at 38, and the front edge of which may be welded to the upright sleeve at 39.

The lower drawbar 11 may be attached to the windrower tongue 5 by inserting the rear end of the drawbar 11 through the registering openings in the collar 27 and channel 10 until the openings at the rear end of the drawbar 11 register with openings in the upper and lower plates 8, and inserting an eye-bolt 40, or the like, through these registering openings.

The axle 16 may be secured to the pivot pin 17 by means of a yoke 41 welded at 42 to a sleeve 43 which is bolted to the pin 17. The axle 16 is rockably secured to the yoke 41 by means of a pivot pin 44.

The construction is such that a relatively small angular movement of the main tongue 13 will cause a relatively greater angular movement of the short tongue 18 so that a relatively short change in the line of draft of the tongue 13 will cause a greater change in the line of direction of the lower tongue 18 and consequently a relatively short turn.

Figure 4:
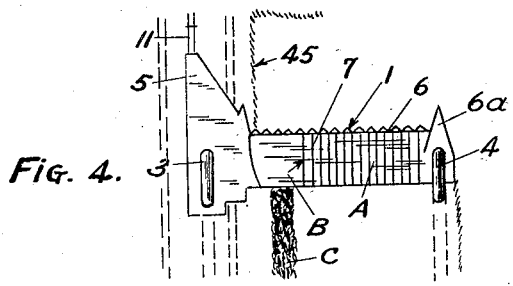
Fig. 4 is a diagrammatic plan view of the windrower showing its relation to the crop to be harvested.

In harvesting a crop, the horses are driven so that the sickle 6 extends substantially from the stubble edge 45 (Fig. 4) to the divider 6a. The crop in front of the conveyor 7 is cut by the sickle 6 and falls onto this conveyor which carries it in the direction of the arrow A and delivers it at the point B on top of that part of the cut crop which falls on the ground to the left of the point B, thus forming a windrow C, which will be out of the path of the wheels 3 and 4 in the next round and will also be out of the way of the horses' feet.

Further modifications will be apparent to those skilled in the art and it is desired, therefore, that the invention be limited only by the scope of the appended claims.

Having thus described my invention, what I claim and desire to secure by Letters Patent is:

1. A horse hitch attachment for a horse-drawn harvesting machine having a reciprocable sickle and a conveyor in the rear of the sickle for receiving the grain therefrom and conveying it toward the stubble side, and wheels for supporting the rear of the machine, said attachment comprising a metal drawbar tube having its rear end detachably securable to the machine, a second metal drawbar tube extending above and parallel to said first tube and forwardly thereof, a metal plate having an opening through which said upper tube extends welded to said upper tube and having its lower edge welded to the lower tube, a plate welded to the rear end of said upper tube and having its lower edge welded to said lower tube, an upright bearing sleeve extending through registering openings in the front end of said upper tube, a pivot pin rotatably mounted in said sleeve, an axle rockably secured to said pivot pin to rotate therewith about an upright axis, steering wheels on said axle, a relatively short tongue secured to rotate with said axle about said upright axis, a second upright pivot pin extending through registering openings in said upper tube in the rear of said first pivot pin, and a relatively long tongue extending forwardly from said second pivot pin and rotatable about the axis thereof, having a shiftable bearing connection with said short tongue whereby an angular movement of said long tongue will cause a greater angular movement of said short tongue, said long tongue having connections for a whiffletree.

2. A horse hitch attachment for a horse-drawn harvesting machine having a reciprocable sickle and a conveyor in the rear of the sickle for receiving the grain therefrom and conveying it toward the stubble side, and wheels for supporting the rear of the machine, said attachment comprising a metal drawbar tube having its rear end detachably securable to the machine, a second metal drawbar tube extending above and parallel to said first tube and forwardly thereof, a metal plate having an opening through which said upper tube extends welded to said upper tube and having its lower edge welded to the lower tube, a plate welded to the rear end of said upper tube and having its lower edge welded to said lower tube, an axle pivotally mounted on said upper tube adjacent its front end to rotate about an upright axis, steering wheels mounted on said axle, a relatively short tongue secured to rotate with said axle, and a long tongue pivotally mounted on said upper tube and rotatable about an upright axis, in the rear of said first axis, having a shiftable bearing connection with said short tongue whereby an angular movement of said long tongue will cause a greater angular movement of said short tongue, said long tongue having connections for a whiffletree.

3. A horse hitch attachment for a horse-drawn harvesting machine having a reciprocable sickle and a conveyor in the rear of the sickle for receiving the grain therefrom and conveying it toward the stubble side, and wheels for supporting the rear of the machine, said attachment comprising a metal drawbar tube having its rear end detachably securable to the machine, a second metal drawbar tube extending above and parallel to said first tube and forwardly thereof, a metal plate having an opening through which said upper tube extends welded to said upper tube and having its lower edge welded to the lower tube, a plate welded to the rear end of said upper tube and having its lower edge welded to said lower tube, an axle pivotally mounted on said upper tube adjacent its front end to rotate about an upright axis, steering wheels mounted on said axle, a relatively short tongue secured to rotate with said axle, a long tongue pivotally mounted on said upper tube and rotatable about an upright axis, in the rear of said first axis, having a shiftable bearing connection with said short tongue whereby an angular movement of said long tongue will cause a greater angular movement of said short tongue, said long tongue having connections for a whiffletree, and a metal gusset having a vertical edge welded to one of said plates and a horizontal edge welded to one of said tubes.

4. A horse hitch attachment for a horse-drawn harvesting machine having a reciprocable sickle and a conveyor in the rear of the sickle for receiving the grain therefrom and conveying it toward the stubble side, and wheels for supporting the rear of the machine, said attachment comprising a metal drawbar tube having its rear end detachably securable to the machine, a second metal drawbar tube extending above and parallel to said first tube and forwardly thereof, a metal plate having an opening through which said upper tube extends welded to said upper tube and having its lower edge welded to the lower tube, a plate welded to the rear end of said upper tube and having its lower edge welded to said lower tube, an upright bearing sleeve extending through registering openings in the front end of said upper tube, a pivot pin rotatably mounted in said sleeve, an axle rockably secured to said pivot pin to rotate therewith about an upright axis, steering wheels on said axle, a relatively short tongue secured to rotate with said axle about said upright axis, a second upright pivot pin extending through registering openings in said upper tube in the rear of said first pivot pin, a relatively long tongue extending forwardly from said second pivot pin and rotatable about the axis thereof, having a shiftable bearing connection with said short tongue whereby an angular movement of said long tongue will cause a greater angular movement of said short tongue, said long tongue having connections for a whiffletree, and a metal gusset having its upper edge welded to said upper tube and its front edge welded to said bearing sleeve.

SHERMAN C. HETH.